US009705906B2

(12) United States Patent
Mesec et al.

(10) Patent No.: US 9,705,906 B2
(45) Date of Patent: Jul. 11, 2017

(54) METHOD AND SYSTEM FOR COMBINING FIBER OPTIC LINK HIERARCHICAL STREAM METADATA WITH INTERNET PROTOCOL METADATA (71) Applicant: RedVector Networks, Inc., Hayward, CA (US)

(72) Inventors: Gilbert R. Mesec, Menlo Park, CA (US); Xiongwei He, San Jose, CA (US); Gordon Robinson, Fremont, CA (US)

(73) Assignee: RedVector Networks, Inc., Hayward, CA (US)

( * ) Notice: Subject to any disclaimer, the term of this patent is extended or adjusted under 35 U.S.C. 154(b) by 412 days.

(21) Appl. No.: 14/513,838

(22) Filed: Oct. 14, 2014

(65) Prior Publication Data
US 2015/0106932 A1    Apr. 16, 2015

Related U.S. Application Data (60) Provisional application No. 61/891,297, filed on Oct. 15, 2013.

(51) Int. Cl.
*H04J 14/00* (2006.01)
*H04L 29/06* (2006.01)
*H04Q 11/00* (2006.01)
*H04L 12/26* (2006.01)

(52) U.S. Cl.
CPC ...... *H04L 63/1425* (2013.01); *H04L 43/0817* (2013.01); *H04Q 11/0005* (2013.01)

(58) Field of Classification Search
CPC .... H04L 7/0008; H04L 63/1425; H04L 69/32
USPC ........................................................ 398/45
See application file for complete search history.

(56) References Cited

U.S. PATENT DOCUMENTS

| 2005/0078683 | A1* | 4/2005 | Page | G10H 1/0058 370/395.5 |
| 2005/0213693 | A1* | 9/2005 | Page | H04L 7/0008 375/354 |
| 2007/0280257 | A1* | 12/2007 | Vare | H04H 20/57 370/395.3 |
| 2015/0067819 | A1* | 3/2015 | Shribman | H04L 67/06 726/12 |

* cited by examiner

*Primary Examiner* — Don N Vo
(74) *Attorney, Agent, or Firm* — Kilpatrick Townsend & Stockton LLP (57) ABSTRACT Physical Layer and Data-Link Layer data are connected with Networking through Application Layer data/information to enable searching, sorting, and identification of novel relationships between signal sources and their contents. Metadata can be used at the Physical Layer in an optical fiber network, connecting with metadata generated at the Data Link Layer, connected to metadata generated at the Network to Application Layer. The Physical Layer metadata is obtained from configuration and provisioning data within an Intelligent Optical System. The Data-Link Layer metadata is obtained from a signal processing device. The Network through Application Metadata is obtained from a packet capture or flow capture probe. The metadata from all layers are linked in a data store such that the network traffic, passing through stream(s) in optical fiber(s) layer data are combined. The effect of that combination enables security, intelligence, surveillance, or network analysts to separate application and network information by original source.

16 Claims, 11 Drawing Sheets

METHOD AND SYSTEM FOR COMBINING FIBER OPTIC LINK HIERARCHICAL STREAM METADATA WITH INTERNET PROTOCOL METADATA

CLAIM OF PRIORITY

The present application claims priority under 35 U.S.C. §119(e) to U.S. Provisional Patent Application Ser. No. 61/891,297, filed on Oct. 15, 2013, and titled "METHOD AND SYSTEM FOR COMBINING FIBER OPTIC LINK HIERARCHICAL STREAM METADATA WITH INTERNET PROTOCOL METADATA", the entire contents of which are incorporated by reference herein.

BACKGROUND

The disclosure pertains to the field of computer networking. The asymmetrical threat posed by cyber-attacks and the persistent vulnerabilities of cyberspace have become an increasing concern to governments and critical national infrastructure operators. Intelligent adversaries in cyberspace today, especially nation-state sponsored actors, can externally co-opt legitimate systems from any locations over the globe to coordinate intrusion attempts. Cyber-attacks provide the ability to cause considerable damages from a remote location with relatively few resources, resulting in the disruption of supply, economic impact, or even a catastrophic event. The global nature of the cyber threat impedes attempts at defining boundaries of cyberspace. Of particular national security concern is the threat of disruption to telecommunications, electrical power, energy pipelines, refineries, financial networks, health systems, and other essential services.

Hypothetical approaches for analyzing these threats become increasingly complex as the communication technologies (data rates and protocol) continue to evolve. The fact is that more smart devices are being connected to the Internet and more traffic is being generated every day. Furthermore, these signal flows across today's networks are frequently changing due to the advances of mobile devices and technologies. As a result, the visibility of analysts can become quickly limited with respect to the network configuration.

A complete situational awareness approach is needed for a comprehensive analytic in order to identify precisely and react quickly to cyber threats. A multi-dimensional methodology requires continual information collection about cyber threats occurring at different geographically diverse locations and the characterization of intelligence across multiple analytic domains. Therefore, analysts are not only presented with the challenge of an unprecedented amount of raw data but also the requirements for integrating different analytic tools. Added to these challenges is the fact that hypothetical solutions would rely on a set of equipment hard-wired to signal processors, resulting in a rigid network that could only handle a small number of signals at a time. When signals are dynamically changing or need to be collected or processed at a different location with new equipment, network operators must re-map the existing processing capacities.

In order to truly implement a comprehensive effort to thwart modern cyber-attacks, analysts require an automated and interoperable solution that is capable of addressing the aforementioned challenges. Automated analytics can increase the speed of action, optimize the decision making process, and ease adoption of new cyber security solutions.

What is needed is an infrastructure capable of integrating new tools and software with minimal disruption and effort, to broaden and strengthen the capabilities of current analytic tools, to create new intelligence, and to improve situational awareness.

SUMMARY

Embodiments include a method of creating a path map of streams contained in an optical fiber network and linking key optical constituent streams to network protocol information contained on those streams. The value of this approach is recognized when the Layer 1 and Layer 2 links and streams are not viewed as transport hierarchies, but as a key intelligence model as to the location, structure, and operation of distant data sources.

Techniques described herein push real network traffic through a digital hierarchy (plesiochronous digital hierarchy (PDH), synchronous digital hierarchy (SDH), and/or synchronous optical networking (SONET)), so the traffic is placed in a variety of transmission containers deep within the optical signal. The hierarchy is then mapped and a name value pair model is made from the transport hierarchy. The transport traffic is then extracted and sent to a probe which creates a name value pair model of the traffic protocols—Layers 3 through 7—with the result saved in a metadata store (or database) in the form of a list of flow records. Each flow record contains a list of attributes in name-value pair format. Each attribute is essentially a Layer 3 to Layer 7 attribute of the captured traffic stream. A correlation between all layers of metadata is created. The correlations are analyzed to show additional relationships between circuits and protocols, addressing, and applications.

Some advantages of using metadata in network analysis are the following. Metadata records of a single flow or conversation, which could have more than 100 columns, occupy about 500-1,000 bytes compared to packet records (commonly called PCAP or trace files) which can range from hundreds to millions of bytes depending on the traffic type. Metadata records reduce backhauling packet records by 95 to 99 percent on average. Metadata records from many different places on the network can be correlated with accurate timestamps. Metadata records can be generated with less computing, memory, and write to disk cycles than comparable full packet records. Metadata records can be used as pointers to full packet records of the same network conversations. Metadata processing systems can analyze network traffic in real-time, enabling faster reaction time to changes in Physical, Data Link, Network through Application layer data. Metadata in pre-processed or processed forms can be integrated with other information sources available to information technology (IT) and intelligence analysts to provide an extremely accurate timeline of events and possible source causation of communications threats or failure phenomenon.

Some embodiments include a method for producing a comprehensive physical network mapping including associated network equipment. The mapping can be based on physical fiber layout, metadata from all layers such as circuit, machine-to-machine communication protocol, flow data, network telemetry data, massive packet capture from end users, etc., and their associations as the proxy for known physical locations. For example, an item of equipment associated with a landline phone number can identify its physical location in a fiber network.

Some embodiments automatically change the connections of an optical switch based on pre-set conditions that satisfy criteria derived from information extracted from the metadata of all layers. Such criteria can include, for example, a SONET overhead, a particular address being moved from one fiber to another, etc.

DETAILED DESCRIPTION

Embodiments disclosed herein include a method of connecting Physical Layer data and Data-Link Layer data with Networking through Application Layer data to create a unique methodology to enable the searching, sorting, and identification of novel relationships between signal sources and their contents. The method can include the use of metadata at the Physical Layer in an optical fiber network, connecting with metadata generated at the Data Link Layer, connected to metadata generated at the Network to Application Layer.

In some embodiments, the Physical Layer metadata can be obtained from the configuration and provisioning data within a Glimmerglass Intelligent Optical System (IOS) by Glimmerglass Path Manager software for control and management of optical fiber transport circuits. The Data-Link Layer metadata can be obtained from a signal processing device. This metadata can be obtained from the device by Path Manager software, for example. The Network through Application Layer metadata can be obtained from a packet capture or flow capture probe, available from a number of vendors.

The Physical, Data-Link, and Network through Application Layer Metadata are linked in a repository, such as a database, a NOSQL data store, or a Big Data store, such that the network traffic, passing through a stream(s) in an optical fiber(s) layer data are all combined. The effect of that combination enables security, intelligence, surveillance, or network analysts to separate application and network information by signal source origins.

Figure 6:
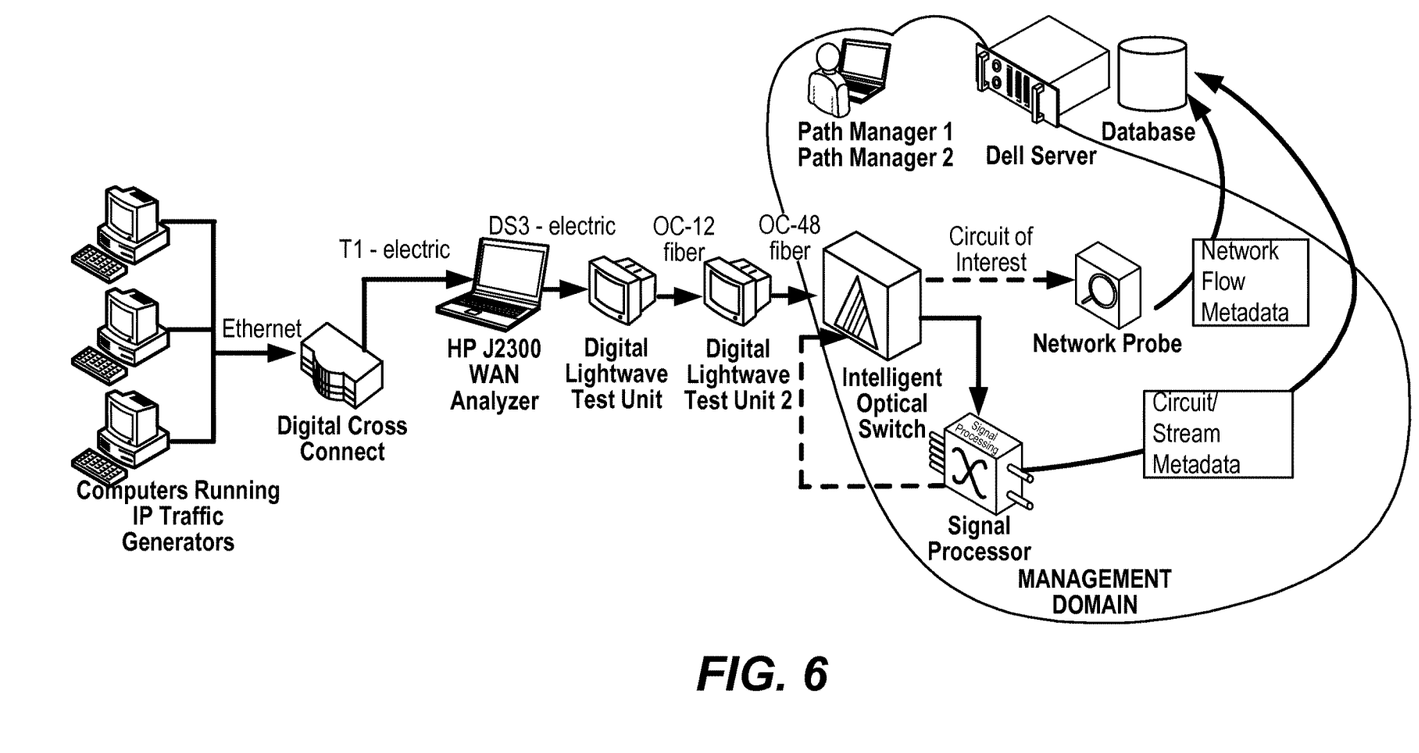
FIG. 6 illustrates an overview of Layer 1, Layer 2, and Layers 3 to 7 metadata, according to an embodiment of the invention.

FIG. 6 illustrates an overview of Layer 1 (L1), Layer 2 (L2), and Layers 3 (L3) to 7 (L7) metadata, according to an embodiment of the invention.

Linking Metadata from Multiple Interconnecting Layers

Some embodiments involve an integrated hardware and software solution to provide a flexible network architecture that enables users to scale their network seamlessly to process more signals at high speed without having to re-architect the existing infrastructure. Software technology can be used to gather network link information at the Physical (e.g., optical) and Data-Link Layers to enable the simplification of collection and distribution of single-mode optical signals in Wide Area Networks (WAN). Embodiments include a method to gather and catalog optical path and link information and to convert that information to a simplified metadata format automatically at high speed. This optical path and link metadata contains valuable information to relate carrier links and the subsequent optical circuit (SONET and SDH) and data stream (PDH) structures contained within. The Circuit and Stream metadata can present an analyst with a circuit/stream which is a proxy for a known physical location, based upon the premise that many of the local carriers, points of presence (POP) and Telco utilize wires and fibers as physical circuits that connect to real building and business addresses.

Some embodiments push real network traffic through a digital hierarchy (PDH, SDH and SONET), so that the traffic is placed in a variety of transmission containers deep within the optical signal. The hierarchy is then mapped. A name-value pair model is made from the transport hierarchy. The transport traffic is then extracted and sent to a probe. The probe creates a name-value pair model of the traffic protocols—Layer 3 through 7—with the result saved in a metadata store (or database) in the form of list of flow records. Each flow record contains a list of attributes in name-value pair format. Each attribute is essentially a Layer 3 through Layer 7 attribute of the captured traffic stream. A correlation between the Transport Circuit and Transport Traffic models is created. The correlations are analyzed to show additional relationships between circuits and protocols, addressing, and applications.

Automation allows the speed of response to approach the speed of attack, rather than relying on human responses to attacks that are occurring at machine speed. With the ability to execute at machine speed, defenders can get inside the turning circle or decision cycles of attackers. Further, automation can make it easier to adopt and adapt new or proven security solutions.

Figure 1:
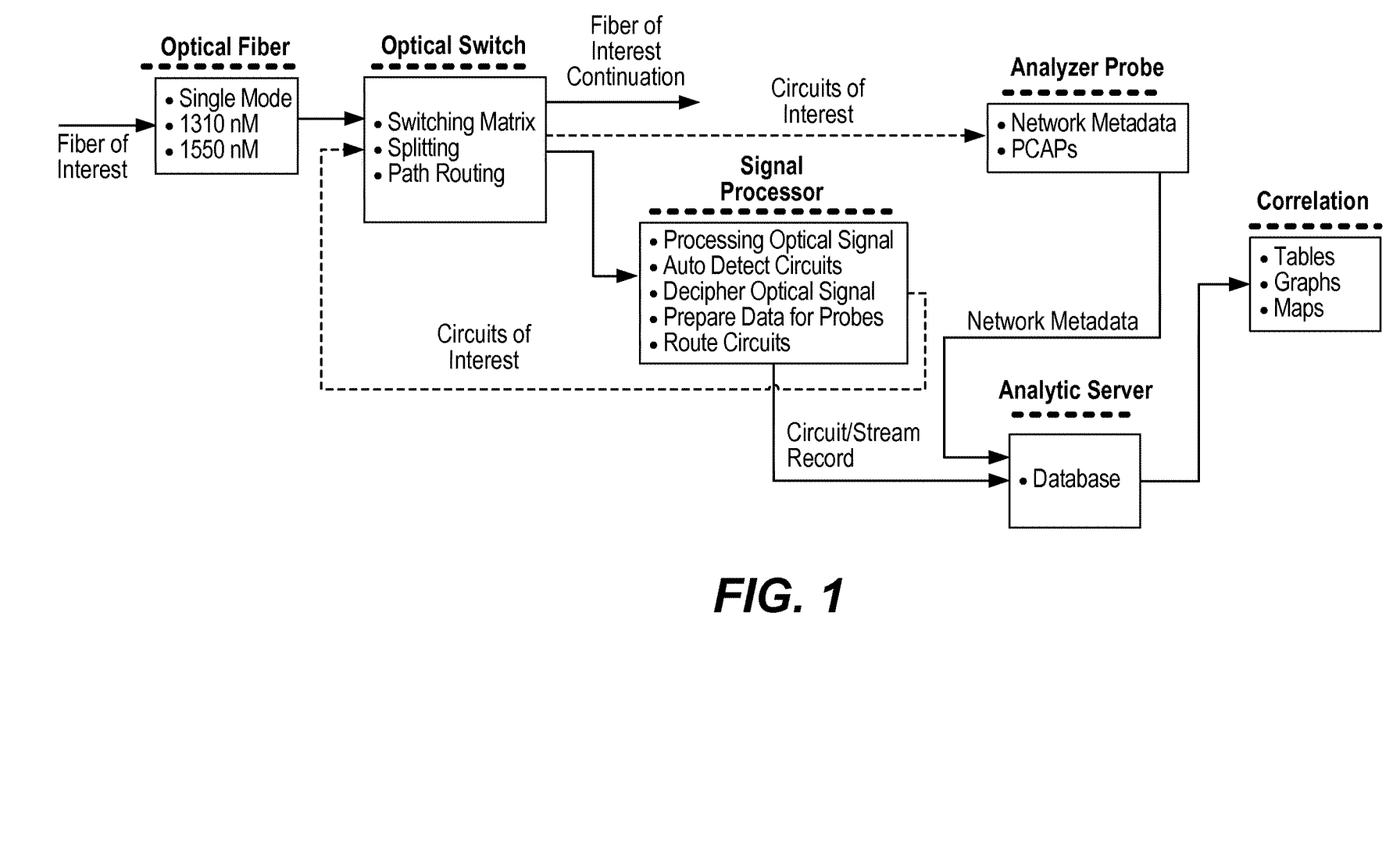
FIG. 1 illustrates an example of an automated network that integrates signal processors, analyzer probes and analytic servers with an optical switch that connects to fibers of interest, according to an embodiment of the invention.

FIG. 1 illustrates an example of an automated network that integrates signal processors, analyzer probes, and analytic servers with an optical switch that connects to fibers of interest, according to an embodiment of the invention. An automated network integrates signal processors, analyzer probes, and analytic servers with an optical switch that connects to fibers of interest. The control software is capable of automating the network configuration based on signal classification defined by users' policies, allowing users to focus on the real task of deciding actions based on the content of each signal, as opposed to dealing with details of network connectivity or complexity of device configuration. According to some embodiments, software supports an intuitive graphical user interface (GUI) that simplifies the tasks of signal discovery, targeting, analysis, and storage, providing the ability to optimize network resource usage to enable users to process the maximum amount of traffic with the given network capacity.

Related Approaches

Packet analyzers, intrusion detection/prevention devices, and deep packet inspection (DPI) devices provide analysts with the ability to gather information from Internet Protocol (IP) network traffic. These products have become mainstream in enterprises' Ethernet packet networks and have been deployed on a number of wide area network (WAN) links, principally to determine routing and Telco switching infrastructure, quality of service (QoS), and service level agreement (SLA) adherence. In addition, the advent of individual country regulations to mandate telephony and data carriers to provide lawful intercept (LI) data to law enforcement agencies has created mainstream techniques for the selective capture of IP traffic.

While the market has been served with a broad range of IP detection, decoding, problem analysis, outsider break-in detection, and data loss prevention products, visibility is limited to IP data at standard Open Systems Interconnection (OSI) model Network (L3) to Application (L7) layers. These products tend to work well in low-speed Enterprise environments where analyzers do not have to deal with extremely heavy link traffic and large-scale distributed network environments. However, gathering, coordinating, and analyzing data on a Telco or country-wide scale is more difficult and expensive.

One approach for limiting the amount of network traffic fed to analytic systems is to limit the data contained in conversations (or flows) about higher order protocols—OSI Layers 3 to 7—by reducing the packet data into a datagram, represented by metadata strings. These metadata strings can be manifested through comma sorted variable (CSV) files, or columnar datasets. These metadata strings can provide a deep understanding of what is present in the conversations, while eliminating the constant polling, connection keep-alive signals, and other meaningless data which gets gathered; such meaningless data merely adds to the length of full packet capture files (PCAPs). Metadata can serve many meaningful purposes in modern network analysis, by reducing the backhaul of captured data, reducing the load on downstream analytic processing mechanisms, and reducing the cost of a large-scale distributed network traffic analytic system.

Various organizations have done some work on standardizing metadata systems for understanding network traffic. The IP Detail Record (IPDR) organization is a consortium of networking equipment, management, and telephony vendors that creates standards regarding the gathering of robust data. The IPDR organization, founded in 1999, merged with the TeleManagement (TM) forum in 2007. NTOP.org is an open source project created in 1998 to promote a simple Web-based monitoring platform.

Network Metadata

Metadata is finding its way into many uses with the advent of searching software that enables the indexing and retrieval of many different types of data and information besides the classic Google or Bing search engines. Metadata can be used in searches to create a mini-scratch table, index, or pointers to a variety of structured and unstructured data, which in may be collected as PCAPs.

Metadata is also finding its way into network packet capture and analysis using approaches that catalogue individual flows or conversations through a five-tuple hash. The five-tuple consists of a source IP address, source TCP/IP port, destination IP address, destination TCP/IP port, and protocol. Other identifiers that may be added to the five-tuple to provide uniqueness and detail can include, for example, a primary application, a session size (in bytes), a session duration, a Layer 7 protocol, a tunnel type, a Layer 3 protocol, a client port, a source port, a client IP address, a source IP address, a unique session identifier, and/or a session start time.

Metadata, or name-value pairs (data descriptor as a column and data value as row), can be added to the five-tuple to create a detailed record of the particular application conversation.

Some advantages of using metadata in network analysis are now described. Metadata records of a single flow or conversation, 20 to 30 columns only, occupy about 500-1,000 bytes, compared to packet records, which can range from hundreds to millions of bytes depending on the traffic type. Metadata records reduce backhauling packet records by 95 to 99 percent on average. Metadata records from many different places on the network can be correlated with accurate timestamps. Metadata records can be generated with less computing, memory, and write to disk cycles than a comparable full PCAP capture. Metadata records can be used as pointers to full PCAP records of the same network conversations. Metadata processing systems can analyze network traffic in real-time, enabling faster reaction time to changes in Physical, Data Link, and Network through Application Layer data.

Embodiments disclosed herein provide considerable value when the monitoring and analytics in a WAN involve packets coming from extended areas or large network. The mapping of the physical fiber network and metadata can quickly identify the location of signals. Banks, utilities, data centers, content providers, and energy companies can use a similar platform for detecting malicious activity and cyber-attacks in an enterprise private network. Uses of embodiments are virtually limitless since different types of sensors, probes, and analytics tools can be connected to the system for different functionalities, such as disaster preparedness and recovery, emergency response, and structural health monitoring.

Circuit Stream Metadata

Figure 2:
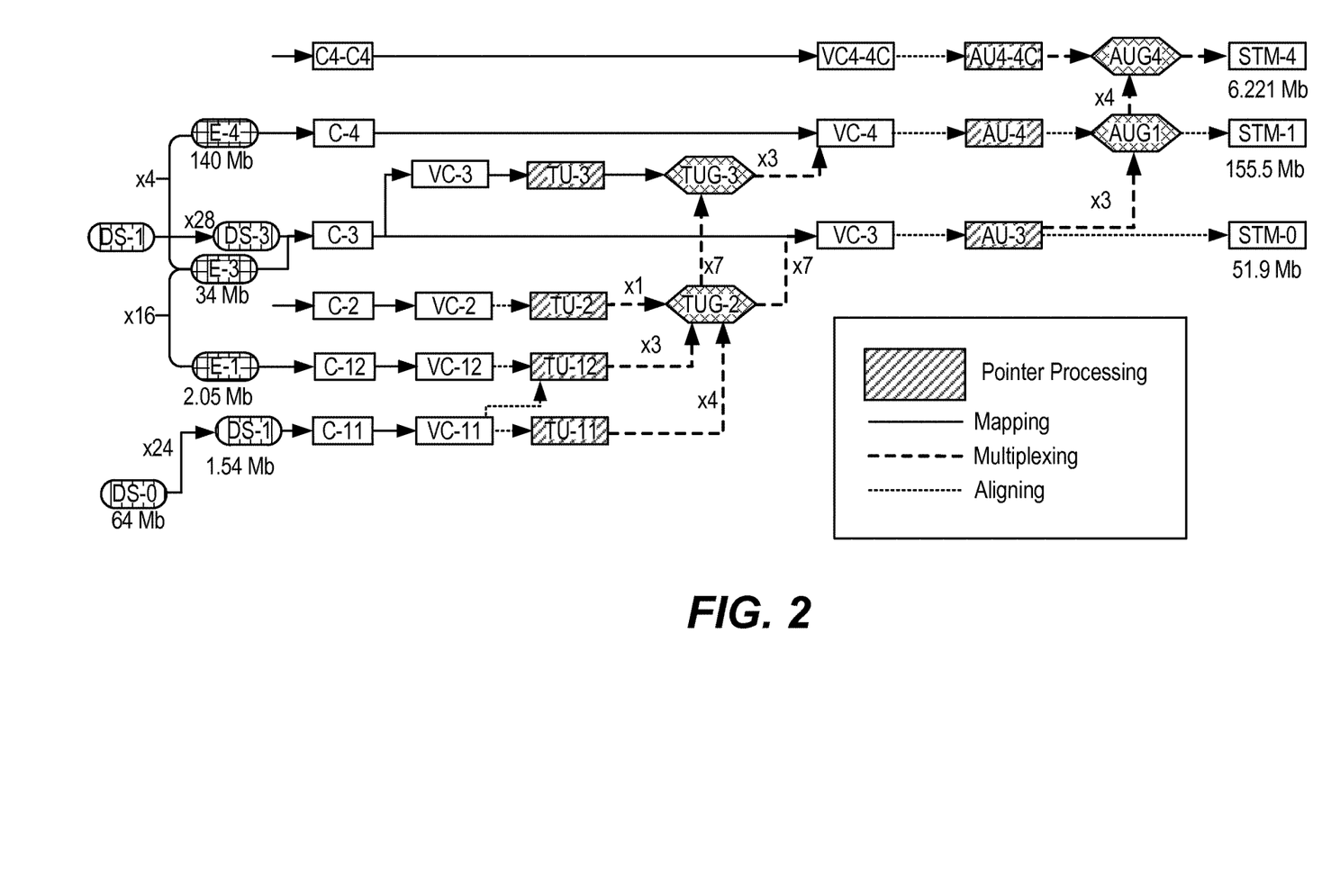
FIG. 2 illustrates an example Digital (PDH) and Optical (SDH) Hierarchy, according to an embodiment of the invention.
Figure 3:
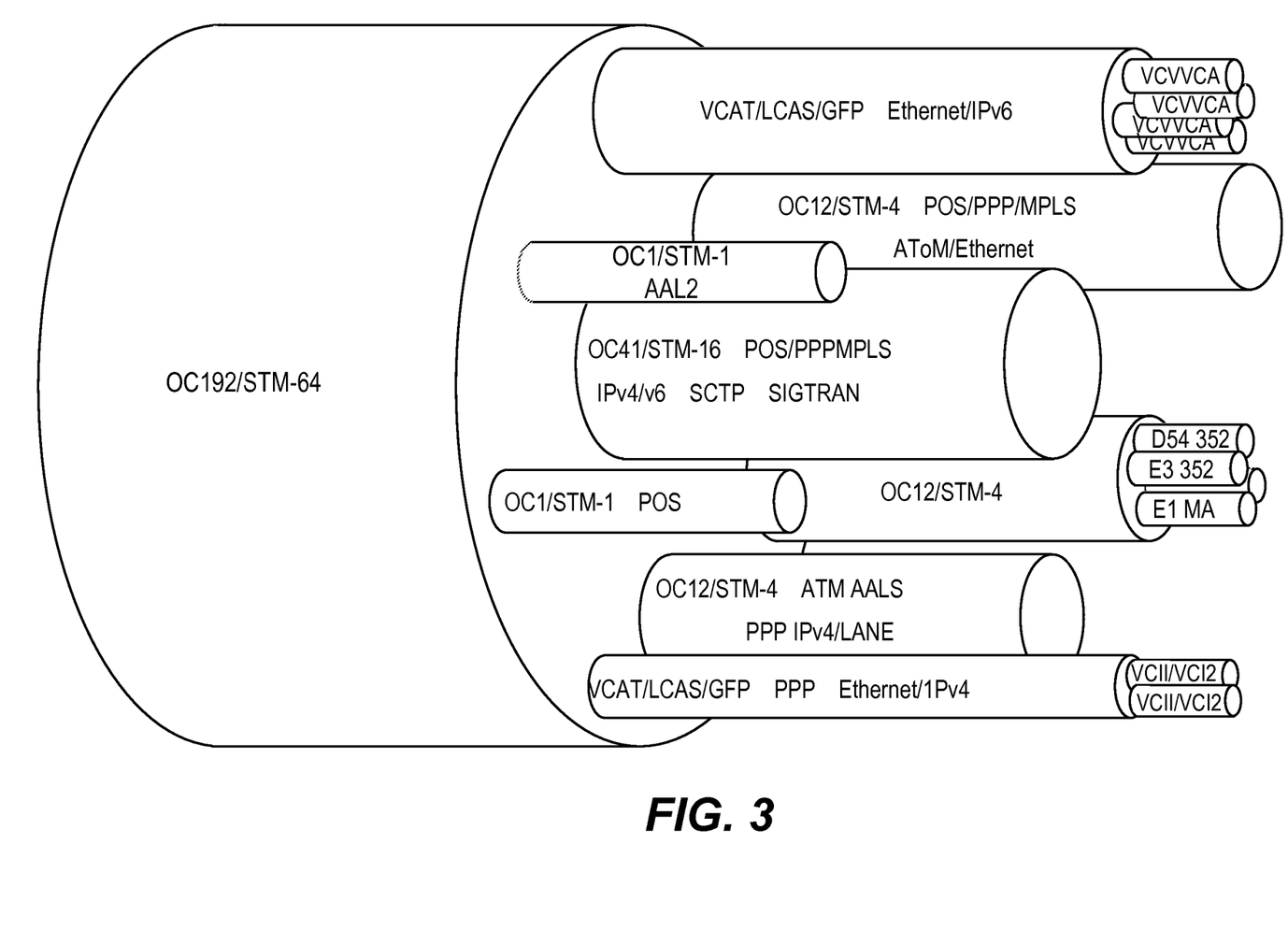
FIG. 3 illustrates a conceptual diagram of optical and digital hierarchies, according to an embodiment of the invention.

Some embodiments use software technology to gather network link information at the Physical (e.g. optical) and Data Link Layers to enable the simplification of collection and distribution of single-mode optical signals in large networks. Techniques described herein present a way to gather and catalog optical path and link information and convert that information to a simplified metadata format. This optical path and link metadata contains valuable information to relate carrier links and the subsequent optical circuits (SONET and SDH) and data streams (PDH) structures contained within. FIG. 2 illustrates an example digital (PDH) and optical (SDH) hierarchy, according to an embodiment of the invention. FIG. 3 illustrates a conceptual diagram of optical and digital hierarchies, according to an embodiment of the invention.

An example of a possible metadata format for a circuit/stream includes the following metadata fields: transport protocol, data link, framing, VMware Cloud Architecture Toolkit (VCAT) mode, group number, stream index, members, low layer framing, high layer framing, input port number, index, type, ID, stream, and discover time. There may be other created values, such as hashes, to ensure the uniqueness of the particular stream and auto discovery time.

Circuit Selection Controller

Some embodiments involve optical circuit controller software. The controller selects the signal sources (fibers of interest) and directs the pre-processed or post processed signals to their destinations through an optical switch. Such embodiments leverage purely optical, photonic signal management techniques to create a transparent path between end points of a network. This feature eliminates the use of Optical-Electronic-Optical (O-E-0) regeneration techniques employed by conventional digital communication fiber networks. This means that the network platform is independent of optical wavelengths, data formats, or data rates. For example, a network platform configured according to embodiments disclosed herein can be capable of managing optical radio frequency (RF) analog signals as well as digital signals such as 10 G or 100 G without the need for hardware or even software upgrades.

Figure 4:
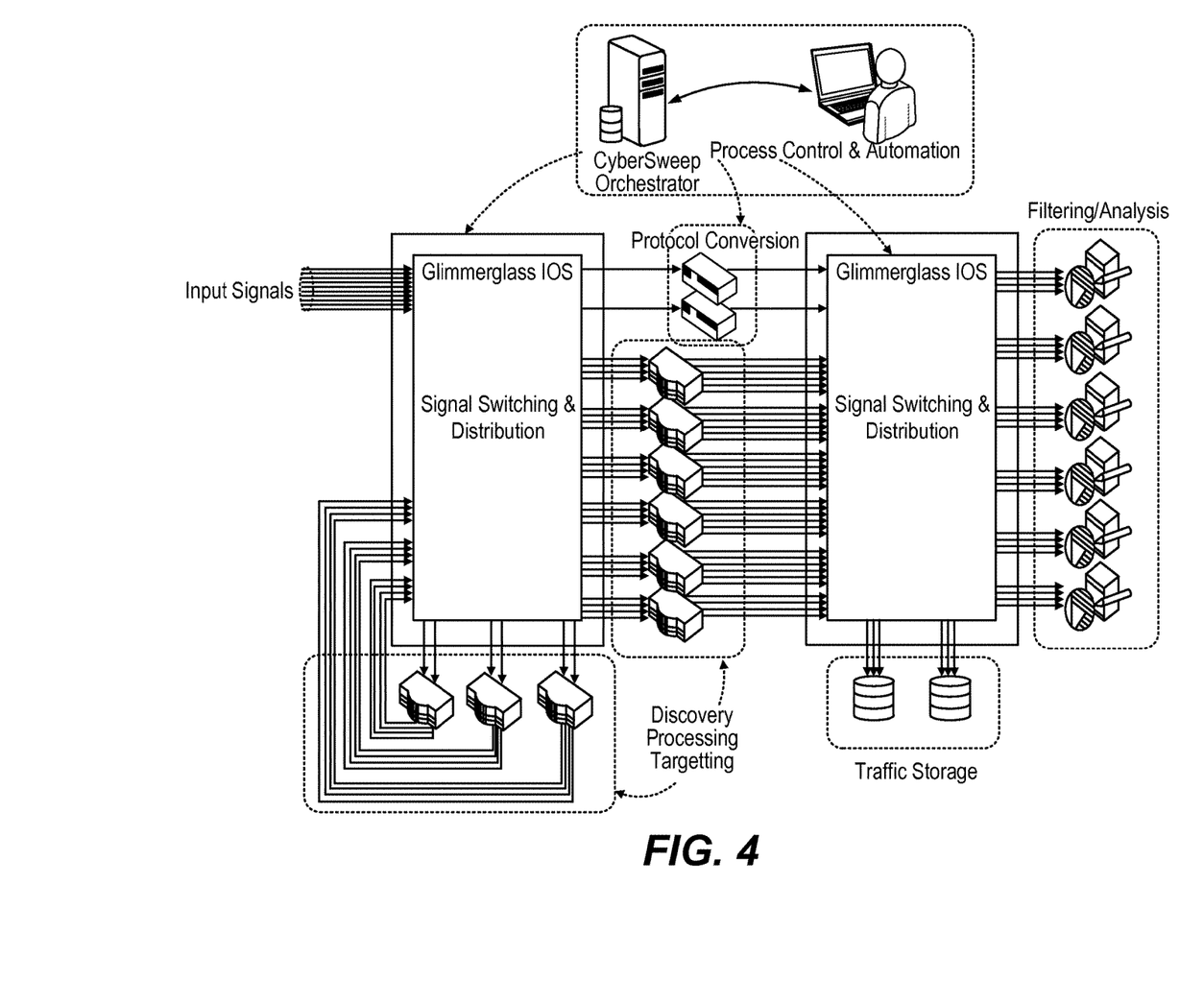
FIG. 4 illustrates a scalable solution to a larger network based on a cluster of optical switches to provide an all-optical end-to-end distribution network, according to an embodiment of the invention.

A simple fiber network might consist of only one optical switch. The switch can be interconnected with data probes, databases, and analytic tools. Shown in FIG. 4 is a scalable solution to a larger network based on a cluster of optical switches to provide an all-optical end-to-end distribution network. Optical splitters (OS) and optical amplifiers (OA) can be utilized to split and boost signals. The software keeps track of the network topology, device, and port availability information to enable the automatic selection of devices and ports. The software automatically selects the devices and ports available for the tasks that user decides to perform on the selected signals. The software also automatically switches signals to the signal processors or protocol converters for discovery, processing, or conversion purposes. In addition, the software distributes the converted traffic to deep packet inspection (DPI) equipment for deep analysis, or to storage devices for temporary storage. The software automatically initiates the discovery, processing, and conversion processes. The software monitors the status of the processes and health of all devices in the network, recording user activities and results of various tasks.

Today's cyber security equipment market consists of many devices developed by a number of different vendors, such as deep packet inspection, virus scanners, intrusion detection systems, and analytic systems, all operating independently with their own security policies. Thus, in today's ecosystem, collaboration is possible but difficult. Embodiments disclosed herein are able to integrate hardware/software from different vendors as one coordinated entity through a transparent switched optical fabric utilizing centralized management software as the unified control. Embodiments disclosed herein allow cyber tools to be coordinated by central policies and to collaborate seamlessly and dynamically in automated defense.

Link/path metadata fields can include, for example, power reading, power status, maximum power, minimum power, waveband, system name, port ID, fiber direction, fiber trunk ID, fiber trunk name, port name, input system ID, and cluster name. These fields can form a unique identifier for a particular optical path and its constituent parts within the fiber network under control.

Determining Physical Locations

Figure 5:
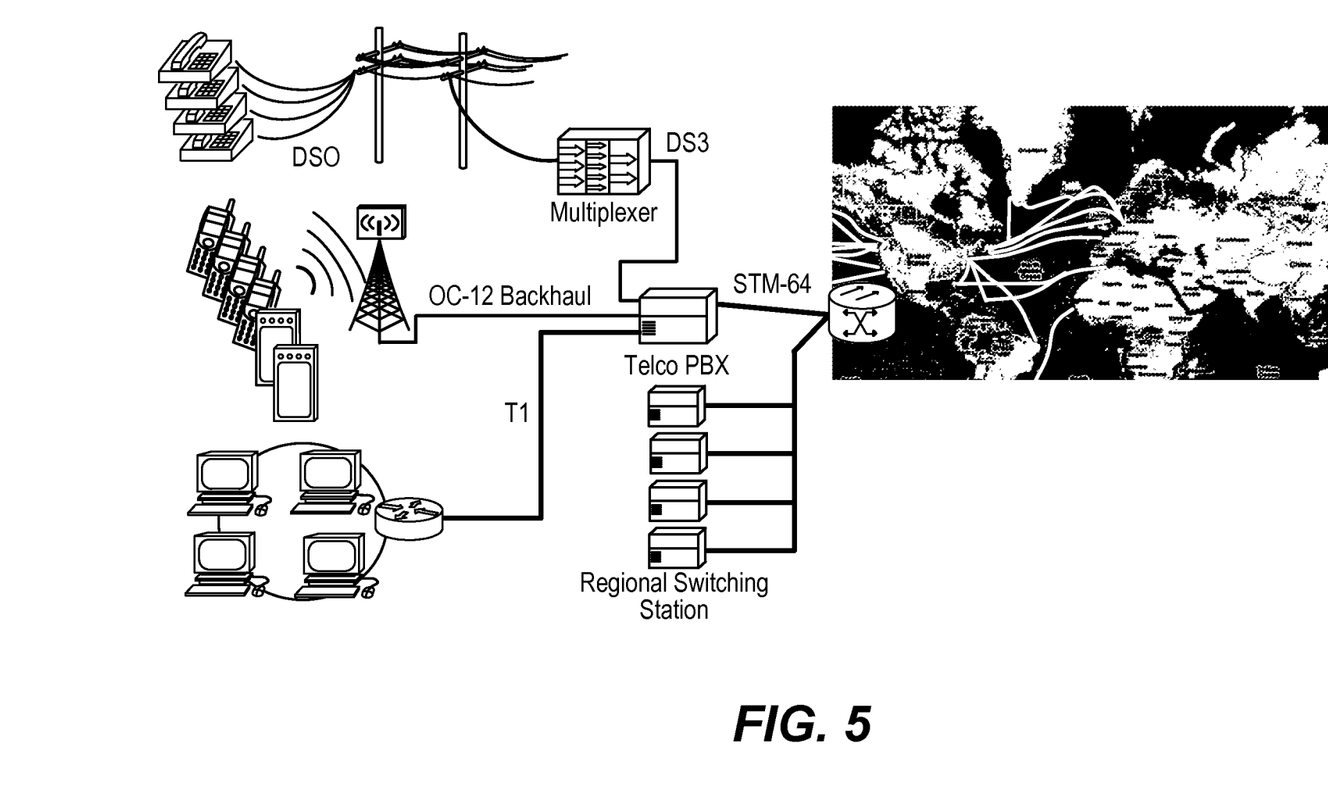
FIG. 5 illustrates an example of circuit localization, according to an embodiment of the invention.

The circuit and stream metadata disclosed herein equips an analyst with a circuit/stream mapping that serves as a proxy for a known physical location, based upon the premise that many of the local carrier, POPs, Telco wires, and fibers represent circuits that are connected to real addresses and businesses. In other words, many lower-layer circuits represent a wire hung on a telephone pole or a cable buried in the ground that terminates at a business location, or a link that terminates at a local switching station. Each circuit has a location (known or unknown) with an origin and destination that folds the individual circuits into a much larger carrier link present in submarine, long haul, and metropolitan fiber cabling. FIG. 5 illustrates an example of circuit localization, according to an embodiment of the invention.

Additional Advantages

According to some embodiments, the circuit and stream metadata may show the changes in traffic volumes at the lowest data circuits. This metadata can provide hints as to how remote, local, and metropolitan networks are configured. Linking circuit and stream metadata with higher-order network metadata may present relationships with Internet addressing, traffic volumes, routing, and tunneling networks, as well as the different applications present in these locations.

If the origin of the network traffic is unknown, then the ability to show the Layer 1 and Layer 2 information enables intelligence analysts to create a probability model for the location of the traffic endpoint using the fixed circuit path source in telephony time-division-multiplexed networks as a reference.

Layer 3 addressing (e.g., IP addressing) can be easily circumvented in order to make addresses appear to originate from locations where they do not really exist. The ability to track IP addresses travelling over Layer 2 and Layer 1 links by using embodiments described herein eliminates the ability to fake endpoint IP address geographic location.

Contextual Meaning

The extraction and examination of link/circuit/stream data has meaning in the context of the higher order protocols passing over network links. Detail provided above explain the significance of connecting Layer 1 and Layer 2 to Layer 3 through Layer 7 metadata.

Example Facilities/Equipment

Although various embodiments can be produced using a variety of different equipment, an example embodiment can be produced using the following equipment: a Glimmerglass IOS System, a Glimmerglass Path Manager, a NetQuest 1-2400 Interceptor, and a RedVector VectorSweep Solution.

Example Schema

Presented below is an example of a schema that some embodiments can use to generate mappings between metadata extracted from different layers of the open systems interconnection (OSI) model.

L1 Schema:
fiberNumber: integer
Fiber Trunk Name: string
Fiber Trunk Number: string
Fiber Trunk Direction: string
OpticalPath:
InputPort: string
OutputPorts: Array of string
PathElements: Array of PathElement
PathElement:
OpticalSystem: string
CrossConnects: Array of CrossConnect
OutgoingLinks: Array of OpticalLink
CrossConnect:
InputPort: integer
OutputPort: integer
Name: string
OpticalLink:
StartPort: string
EndPorts: Array of string SONET L2 Schema:
StreamIndex: string
Protocol: byte
Timestamp: long
L3-L7 Schema:
Timestamp: long
FlowId: long
SourceIP: string
DestIP: string
SourcePort: integer
DestPort: integer
SourceGeo: List of string
DestGeo: List of string
ProtocolFamily: List of integer
ProtocolId: List of integer
ProtocolAttrs: map of <String, Object>

Example System

Figure 9:
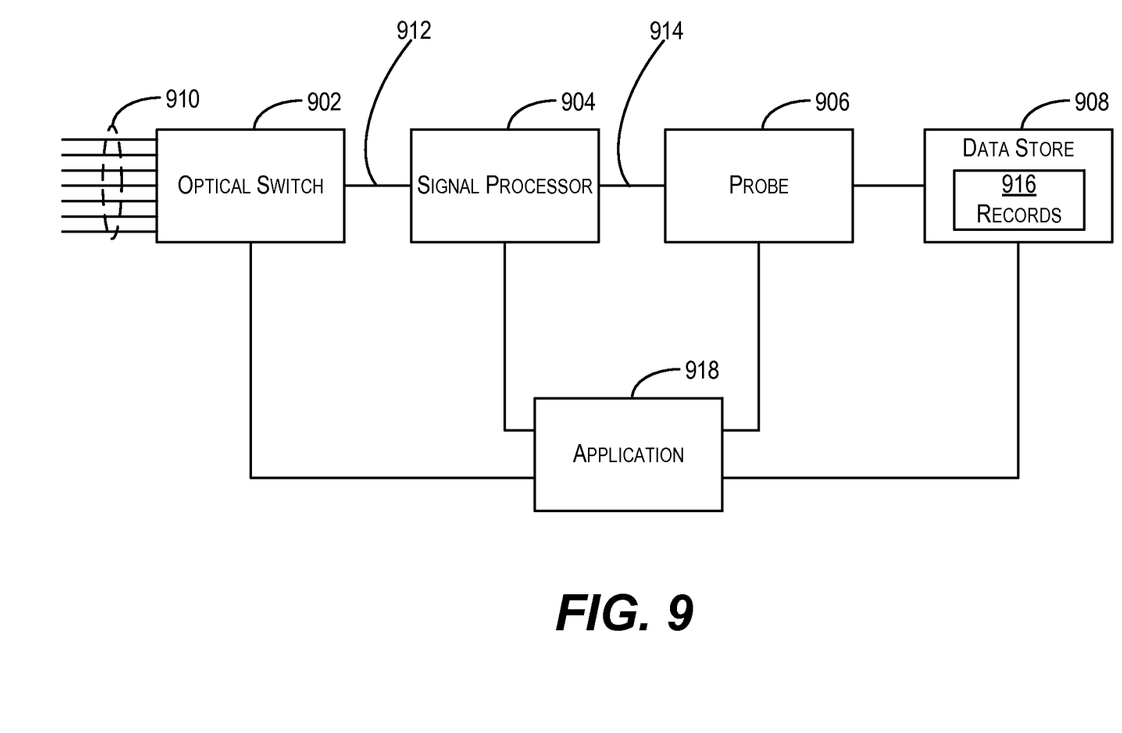
FIG. 9 is a block diagram that illustrates an example of a system for mapping metadata extracted from Layer 1 and Layer 2 to metadata extracted from Layer 3 through Layer 7, according to some embodiments.

FIG. 9 is a block diagram that illustrates an example of a system for mapping metadata extracted from Layer 1 and Layer 2 to metadata extracted from Layer 3 through Layer 7, according to some embodiments. Although an embodiment illustrated in FIG. 9 includes particular components connected in a particular manner, alternative embodiments can include additional, fewer, or different components connected in different manners. FIG. 9 includes an optical switch 902, a signal processor 904, a probe 906, and a data store 908.

Optical switch 902 is configured to extract Physical Layer (Layer 1) metadata from one or more data streams passing through one or more optical fibers 910. The one or more data streams can be carried by signals having wavelengths within an unbounded range of wavelengths, including a first wavelength that differs from a second wavelength. Optical switch 902 can be configured to extract Physical Layer (Layer 1) metadata from data streams carried by signals having varying wavelengths. Optical switch 902 can be configured to extract Physical Layer (Layer 1) metadata from multiple data streams passing through multiple optical fibers.

Signal processor 904 is configured to extract Data Link Layer (Layer 2) metadata from a data stream passing 912 from optical switch 902 to signal processor 904.

Probe 906 is configured to extract Network Layer (Layer 3) metadata, Transport Layer (Layer 4), Session Layer (Layer 5) metadata, Presentation Layer (Layer 6) metadata, and Application Layer (Layer 7) metadata from a data stream 914 passing from signal processor 904 to probe 906.

Data store 908 is configured to store records 916 that map the Physical Layer (Layer 1) metadata to the Data Link Layer (Layer 2) metadata and to the Layer 3 through Layer 7 metadata. Data store 908 can be configured to store records 916 that map the Physical Layer (Layer 1) metadata from each of multiple data streams passing through multiple optical fibers to the Data Link Layer (Layer 2) metadata and to the Layer 3 through Layer 7 metadata.

In some embodiments, an application 918 is configured to control the extraction, by optical switch 902, of Physical Layer (Layer 1) metadata from a data stream passing through one or more optical fibers 910. In some embodiments, application 918 is configured to control extraction, by signal processor 904, of Data Link Layer (Layer 2) metadata from data stream 912. In some embodiments, application 918 is configured to control extraction, by probe 906, of Network Layer (Layer 3) metadata, Transport Layer (Layer 4), Session Layer (Layer 5) metadata, Presentation Layer (Layer 6) metadata, and Application Layer (Layer 7) metadata from data stream 914. In some embodiments, application 918 is configured to store, in data store 908, records that map the Physical Layer (Layer 1) metadata to the Data Link Layer (Layer 2) metadata and to the Layer 3 through Layer 7 metadata. In some embodiments, records 916 indicate at least one relationship between one or more optical fibers 910, a circuit, a protocol, an address, and an application. In some embodiments, for each particular data stream of multiple data streams, records 916 identify a separate fiber, of multiple optical fibers, through which that particular data stream passes.

Example Techniques

Figure 10:
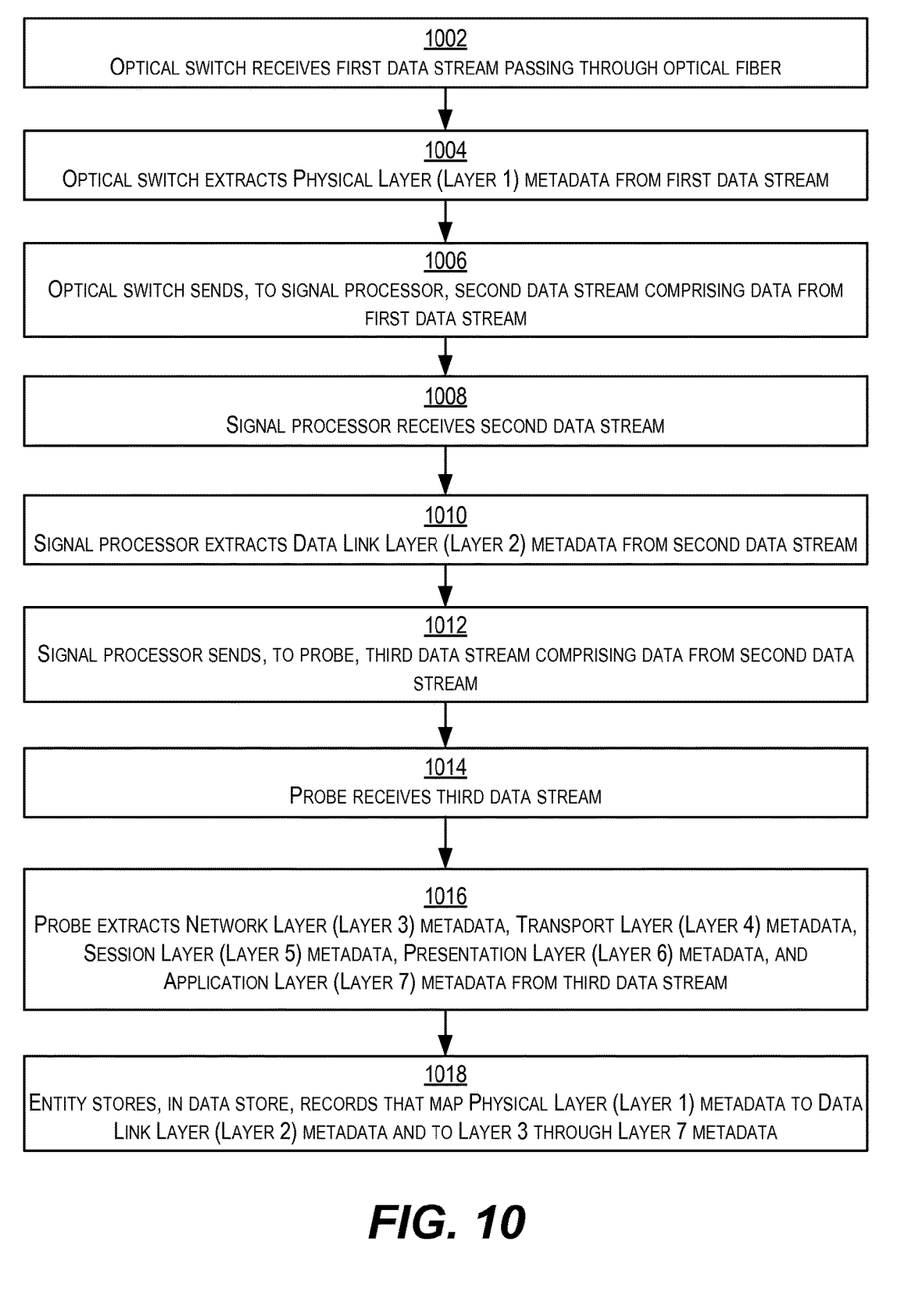
FIG. 10 is a flow diagram that illustrates an example of a technique for mapping metadata extracted from Layer 1 and Layer 2 to metadata extracted from Layer 3 through Layer 7, according to some embodiments.

FIG. 10 is a flow diagram that illustrates an example of a technique for mapping metadata extracted from Layer 1 and Layer 2 to metadata extracted from Layer 3 through Layer 7, according to some embodiments. Although an embodiment illustrated in FIG. 10 includes particular operations being performed in a particular order, alternative embodiments can include additional, fewer, or different operations performed in different orders.

In block 1002, an optical switch receives a first data stream passing through an optical fiber.

In block 1004, the optical switch extracts Physical Layer (Layer 1) metadata from the first data stream.

In block 1006, the optical switch sends, to a signal processor, a second data stream comprising data from the first data stream.

In block 1008, the signal processor receives the second data stream.

In block 1010, the signal processor extracts Data Link Layer (Layer 2) metadata from the second data stream.

In block 1012, the signal processor sends, to a probe, a third data stream comprising data from the second data stream.

In block 1014, the probe receives the third data stream.

In block 1016, the probe extracts Network Layer (Layer 3) metadata, Transport Layer (Layer 4), Session Layer (Layer 5) metadata, Presentation Layer (Layer 6) metadata, and Application Layer (Layer 7) metadata from the third data stream.

In block 1018, an entity stores, in a data store, records that map the Physical Layer (Layer 1) metadata to the Data Link Layer (Layer 2) metadata and to the Layer 3 through Layer 7 metadata.

Figure 11:
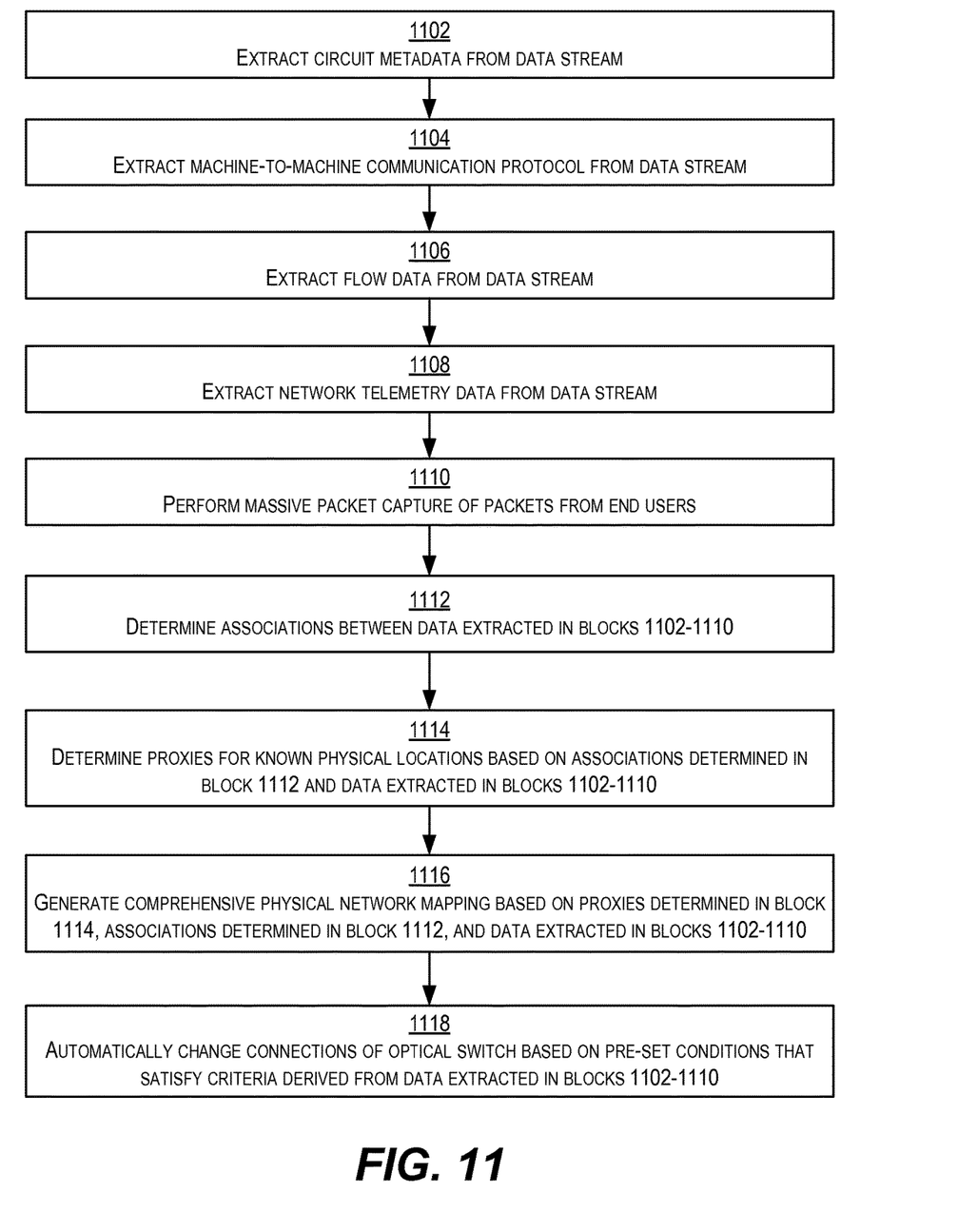
FIG. 11 is a flow diagram that illustrates an example of a technique for producing a comprehensive physical network mapping, according to some embodiments.

FIG. 11 is a flow diagram that illustrates an example of a technique for producing a comprehensive physical network mapping, according to some embodiments. Although an embodiment illustrated in FIG. 11 includes particular operations being performed in a particular order, alternative embodiments can include additional, fewer, or different operations performed in different orders.

In block 1102, circuit metadata is extracted from a data stream.

In block 1104, a machine-to-machine communication protocol is extracted from the data stream.

In block 1106, flow data is extracted from the data stream.

In block 1108, network telemetry data is extracted from the data stream.

In block 1110, a massive packet capture of packets from end users is performed.

In block 1112, associations between the data extracted in blocks 1102-1110 are determined.

In block 1114, proxies for known physical locations are determined based on the associations determined in block 1112 and the data extracted in blocks 1102-1110.

In block 1116, a comprehensive physical network mapping, which includes associated network equipment, is generated based on the proxies determined in block 1114, the associations determined in block 1112, and the data extracted in blocks 1102-1110. The mapping can be stored and/or displayed.

In block 1118, connections of the optical switch are automatically changed based on pre-set conditions that satisfy criteria derived from the data extracted in blocks 1102-1110. Such conditions can involve a SONET overhead, a particular address being moved from one fiber to another, etc.

Hardware Overview

Figure 7:
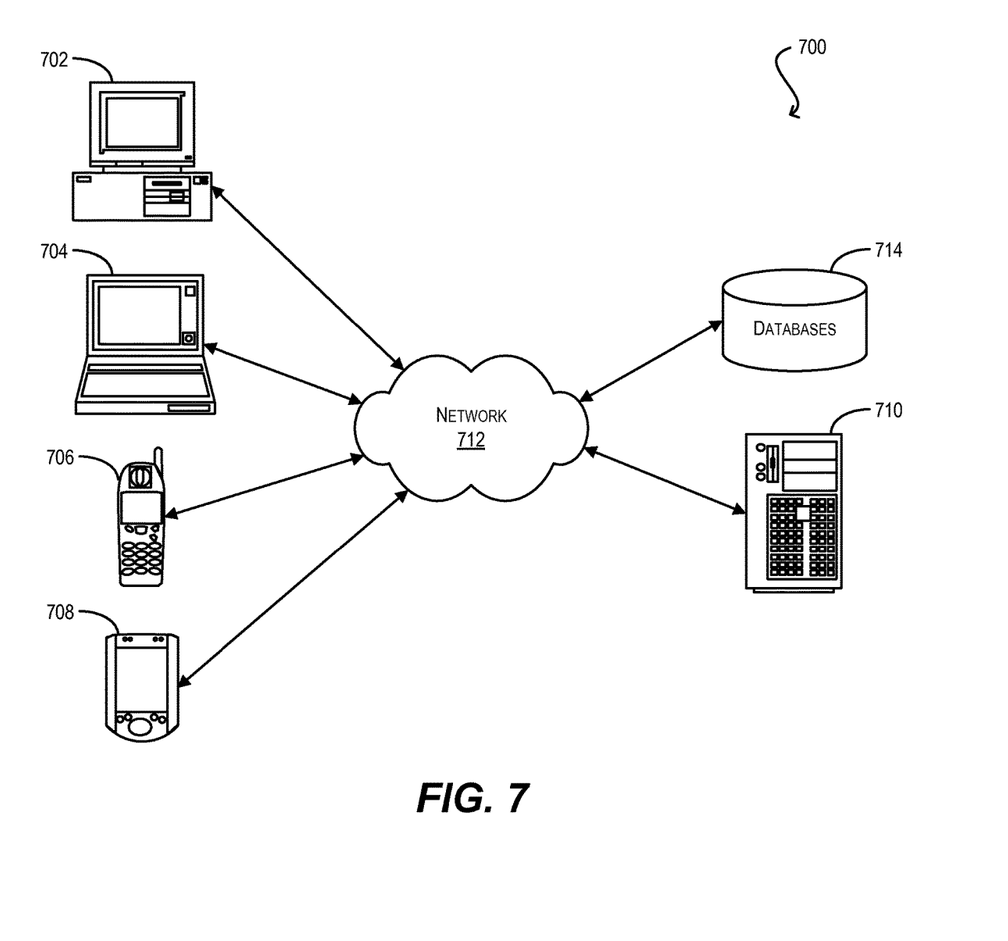
FIG. 7 is a simplified block diagram illustrating a system environment that can be used in accordance with an embodiment of the present invention.

FIG. 7 is a simplified block diagram illustrating a system environment 700 that can be used in accordance with an embodiment of the present invention. As shown, system environment 700 can include one or more client computing devices 702, 704, 706, 708, which can be configured to operate a client application such as a web browser, a UNIX/Solaris terminal application, and/or the like. In one set of embodiments, client computing devices 702, 704, 706, 708 may be configured to run one or more client applications.

Client computing devices 702, 704, 706, 708 can be general purpose personal computers (e.g., personal computers and/or laptop computers running various versions of Microsoft Windows and/or Apple Macintosh operating systems), cell phones, or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, 708 can be any other electronic device capable of communicating over a network, such as network 712 described below. Although system environment 700 is shown with four client computing devices, it should be appreciated that any number of client computing devices can be supported.

System environment 700 can further include a network 712. Network 712 can be any type of network familiar to those skilled in the art. Network 712 may support data communications using a network protocol, such as TCP/IP, SNA, IPX, AppleTalk, and the like. Merely by way of example, network 712 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 can further include one or more server computers 710 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 710 can run an operating system including any of those discussed above, as well as any commercially available server operating system. Server 710 can also run any of a variety of server applications and/or mid-tier applications, including web servers, FTP servers, CGI servers, Java virtual machines, and the like.

System environment 700 can further include one or more databases 714. In one set of embodiments, databases 714 can include databases that are managed by server 710. Databases 714 can reside in a variety of locations. By way of example, databases 714 can reside on a storage medium local to (and/or resident in) one or more of computers 702, 704, 706, 708, and 710. Alternatively, databases 714 can be remote from any or all of computers 702, 704, 706, 708, and 710, and/or in communication (e.g., via network 712) with one or more of these. In one set of embodiments, databases 714 can reside in a storage-area network (SAN) familiar to those skilled in the art.

Figure 8:
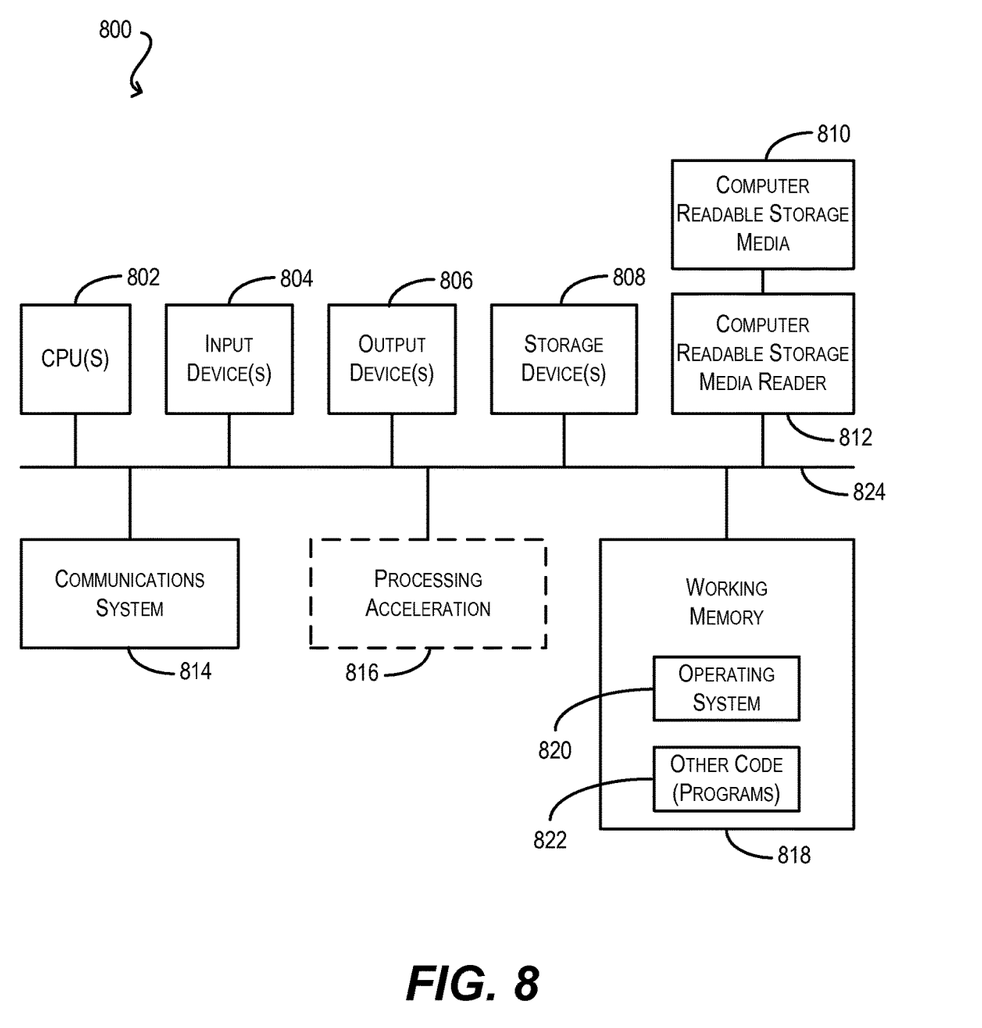
FIG. 8 is a simplified block diagram illustrating a computer system that can be used in accordance with an embodiment of the present invention.

FIG. 8 is a simplified block diagram illustrating a computer system 800 that can be used in accordance with an embodiment of the present invention. In various embodiments, computer system 800 can be used to implement any of computers 702, 704, 706, 708, and 710 described with respect to system environment 700 above. As shown, computer system 800 can include hardware elements that are electrically coupled via a bus 824. The hardware elements can include one or more central processing units (CPUs) 802, one or more input devices 804 (e.g., a mouse, a keyboard, etc.), and one or more output devices 806 (e.g., a display device, a printer, etc.). Computer system 800 can also include one or more storage devices 808. By way of example, the storage device(s) 808 can include devices such as disk drives, optical storage devices, and solid-state storage devices such as a random access memory (RAM) and/or a read-only memory (ROM), which can be programmable, flash-updateable and/or the like.

Computer system 800 can additionally include a computer-readable storage media reader 812, a communications subsystem 814 (e.g., a modem, a network card (wireless or wired), an infra-red communication device, etc.), and working memory 818, which can include RAM and ROM devices as described above. In some embodiments, computer system 800 can also include a processing acceleration unit 816, which can include a digital signal processor (DSP), a special-purpose processor, and/or the like.

Computer-readable storage media reader 812 can be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 can permit data to be exchanged with network 712 and/or any other computer described above with respect to system environment 700.

Computer system 800 can also comprise software elements, shown as being currently located within working memory 818, including an operating system 820 and/or other code 822, such as an application program (which may be a client application, Web browser, middle tier/server application, etc.). It should be appreciated that alternative embodiments of computer system 800 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 800 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, embodiments of the present invention are not restricted to operation within certain specific data processing environments, but are free to operate within a plurality of data processing environments. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

The contents of U.S. Provisional Patent Application Ser. No. 61/948,476, titled "IMPLICIT RELATIONSHIP DISCOVERY BASED ON CUMULATIVE CO-TEMPORAL ACTIVITY," and filed on Mar. 5, 2014, are incorporated by reference herein.

The contents of U.S. Provisional Patent Application Ser. No. 61/988,777, titled "IMPLICIT RELATIONSHIP DISCOVERY BASED ON NETWORK ACTIVITY PROFILE SIMILARITIES," and filed on May 5, 2014, are incorporated by reference herein.

What is claimed is:

1. A system comprising:
an optical switch configured to extract Physical Layer (Layer 1) metadata from one or more data streams passing through one or more optical fibers;
a signal processor configured to extract Data Link Layer (Layer 2) metadata from a data stream passing from the optical switch to the signal processor;
a probe configured to extract Network Layer (Layer 3) metadata, Transport Layer (Layer 4), Session Layer (Layer 5) metadata, Presentation Layer (Layer 6) metadata, and Application Layer (Layer 7) metadata from a data stream passing from the signal processor to the probe; and
a data store configured to store records that map the Physical Layer (Layer 1) metadata to the Data Link Layer (Layer 2) metadata and to the Layer 3 through Layer 7 metadata;
wherein the one or more data streams are carried by signals having wavelengths within an unbounded range of wavelengths, including a first wavelength that differs from a second wavelength.

2. The system of claim 1, wherein:
the records indicate at least one relationship between a particular fiber of the one or more optical fibers, a circuit, a protocol, an address, and an application.

3. The system of claim 1, wherein:
the optical switch, the signal processor, and the probe are controlled by a particular application.

4. The system of claim 1, wherein:
connections of the optical switch are automatically changeable based on pre-set conditions that satisfy criteria derived from extracted items of data.

5. A method comprising:
receiving, at an optical switch, a first data stream passing through an optical fiber;
extracting, at the optical switch, Physical Layer (Layer 1) metadata from the first data stream;
sending, from the optical switch to a signal processor, a second data stream comprising data from the first data stream;
receiving the second data stream at the signal processor;
extracting, at the signal processor, Data Link Layer (Layer 2) metadata from the second data stream;
sending, from the signal processor to a probe, a third data stream comprising data from the second data stream;
receiving the third data stream at the probe;
extracting, at the probe, Network Layer (Layer 3) metadata, Transport Layer (Layer 4), Session Layer (Layer 5) metadata, Presentation Layer (Layer 6) metadata, and
Application Layer (Layer 7) metadata from the third data stream; and
storing, in a data store, records that map the Physical Layer (Layer 1) metadata to the Data Link Layer (Layer 2) metadata and to the Layer 3 through Layer 7 metadata.

6. The method of claim 5, wherein:
the records indicate at least one relationship between the optical fiber, a circuit, a protocol, an address, and an application.

7. The method of claim 5, wherein:
the optical switch, the signal processor, and the probe are controlled by a particular application.

8. A method comprising:
extracting multiple items of data from a data stream;
determining associations between the extracted items of data;
determining proxies for known physical locations based on the associations and the extracted items of data; and
generating a physical network mapping, including associated network equipment, based on the proxies, the associations, and the extracted items of data.

9. The method of claim 8, further comprising:
determining that pre-set conditions satisfy criteria derived from the extracted items of data; and
in response to determining that the pre-set conditions satisfy the criteria, automatically changing, based on the pre-set conditions, connections of an optical switch through which the data stream passed.

10. The method of claim 9, wherein:
the pre-set conditions specify a SONET overhead.

11. The method of claim 9, wherein:
the pre-set conditions specify a particular address being moved from one fiber to another fiber.

12. The method of claim 8, wherein extracting multiple items of data from a data stream comprises:
extracting circuit metadata from the data stream.

13. The method of claim 8, wherein extracting multiple items of data from a data stream comprises:
extracting a machine-to-machine communication protocol from the data stream.

14. The method of claim 8, wherein extracting multiple items of data from a data stream comprises:
extracting flow data from the data stream.

15. The method of claim 8, wherein extracting multiple items of data from a data stream comprises:
 extracting network telemetry data from the data stream.

16. The method of claim 8, wherein extracting multiple items of data from a data stream comprises:
 capturing packets from end users.

\* \* \* \* \*